United States Patent [19]

Matsui et al.

[11] Patent Number: 4,937,483

[45] Date of Patent: Jun. 26, 1990

[54] EDDY-CURRENT BRAKE

[75] Inventors: Norio Matsui; Isao Sanjo; Shuuichi Chiba, all of Kanagawa, Japan

[73] Assignee: Tokyo-Buhin Kogyo Co., Ltd., Kanagawa, Japan

[21] Appl. No.: 294,568

[22] PCT Filed: Nov. 18, 1987

[86] PCT No.: PCT/JP87/00893

§ 371 Date: Dec. 16, 1988

§ 102(e) Date: Dec. 16, 1988

[87] PCT Pub. No.: WO89/05055

PCT Pub. Date: Jun. 1, 1989

[51] Int. Cl.⁵ .................... H02K 49/04; H02K 1/18; B60L 7/00

[52] U.S. Cl. ........................... 310/105; 310/93; 310/218; 188/161

[58] Field of Search ............... 310/93, 105, 208, 218; 188/159, 161

[56] References Cited

FOREIGN PATENT DOCUMENTS

| 112405 | 2/1941 | Australia | 310/103 |
| 401019 | 8/1909 | France | 310/93 |
| 48-27148 | 4/1973 | Japan | |
| 50-18131 | 6/1975 | Japan | |
| 56-132160 | 10/1981 | Japan | |
| 56-133963 | 10/1981 | Japan | |
| 56-148170 | 11/1981 | Japan | |
| 1020935 | 5/1983 | U.S.S.R. | 310/93 |
| 433408 | 8/1935 | United Kingdom | 310/93 |
| 675379 | 7/1952 | United Kingdom | 310/105 |

Primary Examiner—Peter S. Wong
Assistant Examiner—C. LaBalle
Attorney, Agent, or Firm—Flynn, Thiel, Boutell & Tanis

[57] ABSTRACT

An eddy-current brake comprising a rotor or rotors made of a ferromagnetic material and electromagnets, in which the rotor is so disposed that it crosses the magnetic flux and a braking force is produced by the eddy current generated in the rotor. The rotor is provided with a metallic layer formed from a non-magnetic material having a greater electroconductivity than the rotor, and the coil of each electromagnet is enclosed by a magnetic pole case made of a ferromagnetic material, so that the device is capable of developing a large braking torque and suited for use as an auxiliary brake for vehicles.

17 Claims, 3 Drawing Sheets

EDDY-CURRENT BRAKE

FIELD OF THE ART

The present invention relates to an eddy-current brake comprising a pair of rotors or a single rotor made of a ferromagnetic material and electromagnets arranged and designed to increase the eddy current generated in the rotor, in which said elements are arranged so that the rotor crosses the magnetic flux and a large braking force will be produced by the eddy current generated in said rotor.

BACKGROUND ART

The conventional eddy-current brakes had the defect that their weight per braking torque developed was large in comparison with the brakes of other systems. FIG. 11 of the accompanying drawings illustrates in section a typical example of conventional disc type eddy-current brakes. In this brake, as shown in the drawing, flange couplings 1, 2 are joined to the axle to be braked. Main shaft 3 is joined to said couplings, 1, 2 so that they won't rotate relative to each other but will be able to rotate integrally with the axle to be braked. Also, discs 4, 5 are fixed to said main shaft 3 so that they won't rotate relative to each other. Electromagnets 10, each comprising a coil 6 and magnetic pole 7, are provided radially on the same circumference of a circle centered by main shaft 3. Said electromagnets 10 are fixed to a fixing plate 9 in a stelliform arrangement with a slight spacing from said discs 4, 5. Main shaft 3 is also rotatably secured to said fixing plate 9 through ball bearings 8. This fixing plate 9 itself is fixed immovably to a brake block. Thus, normally, discs 4, 5 rotate together with the axle to be braked. In this state, electromagnets 10 are not electrified. They are electrified when the axle is to be braked. The magnetic line of force generated by each said electromagnet 10 forms a closed curve involving magnetic pole 7 and disc 4 or 5, and an eddy current is generated in said discs 4 and 5 to produce a force acting oppositely to the direction of rotation, viz. braking force, on said discs 4 and 5.

Thus, in the eddy-current brakes, rotors made of a ferromagnetic material and magnets are provided in such an arrangement that each rotor crosses the magnetic flux and a braking force will be produced by an eddy current generated in said rotor. In this system, therefore, the smaller the electric resistance of the material of the rotors, i.e., discs 4, 5 in FIG. 11, the greater becomes the braking torque developed provided that the other conditions, namely wire size and number of turns of coil 6, electric current applied thereto and space between magnetic pole 7 and disc 4 (5) are the same. However, as it is an essential codition that discs 4, 5 be made of a magnetic material, no remarkable difference is produced in the torque developed no matter what type of magnetic material is used. Thus, it has been the common problem to the conventional eddy-current brakes that there can not be obtained a large braking torque in comparison with the brakes of other systems no matter what material is used for the rotors, viz. discs 4, 5. Also, in the conventional eddy-current brake illustrated in FIG. 11, each electromagnet 10 is constituted by a magnetic pole 7 projecting axially from the center of bottom plate 11 and a coil 6 comprising a copper wire wound up on said magnetic pole 7, and such electromagnets 10 are disposed opposing to and slightly spaced-apart from discs 4, 5 so that the opposite polarities are positioned alternately to each other. Therefore, the magnetic line of force generated by each said electromagnet 10 describes a closed curve that passes magnetic pole 7 of the adjacent electromagnets 10, fixing plate 9 and one of the discs 4 or 5. Thus, because of the long magnetic path, the intensity of the magnetic field formed is weak.

The object of this invention is to provide an eddy-current brake which is free of said problems of the prior art and capable of developing a large braking torque per unit weight.

SUMMARY OF THE INVENTION

In the present invention, a metallic layer formed from a non-magnetic material having a greater electroconductivity than the rotor material is bonded to that face of the rotor which opposes the magnetic poles of the electromagnets. This technical means constribute to the increase of eddy current generated in the rotor, which leads to an increased braking torque. Also, the coil of electromagnet is enclosed by a magnetic pole case made of a ferromagnetic material and so designed that its selectional area where the magnetic line of force passes will be equal to or greater than the cross-section of the magnetic pole. This arrangement makes it possible to substantially halve the magnetic path of electromagnet as compared with the conventional mechanism, and accordingly the intensity of the magnetic field produced by the electromagnets is almost doubled. Further, since the eddy current generated by one piece of electromagnet increases because of the generation of extra eddy current by the magnetic pole case, the braking torque developed is enlarged.

BEST MODE FOR CARRYING OUT THE INVENTION

Figure 2:
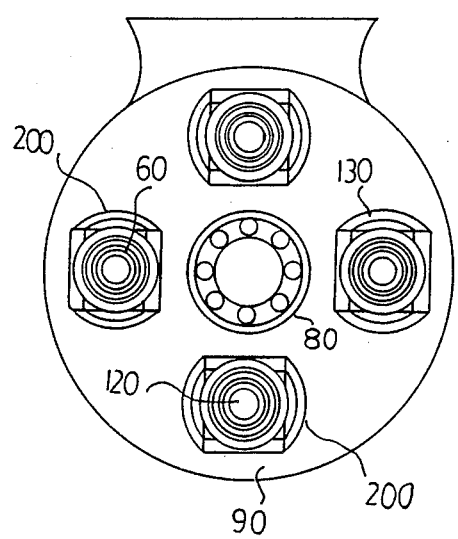
FIG. 2 is a schematic layout of electromagnets in said brake.
Figure 1:
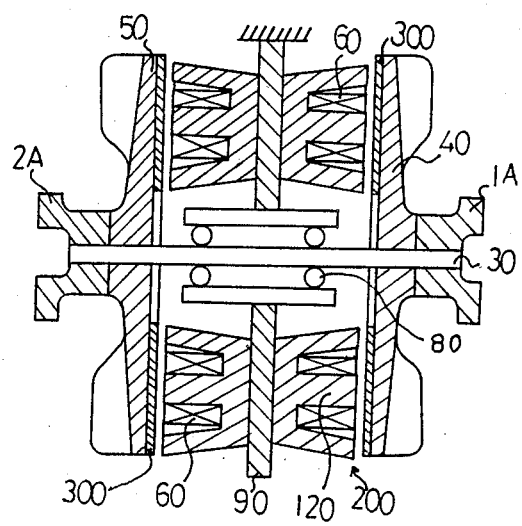
FIG. 1 is a sectional view of a disc type eddy-current brake in accordance with this invention.
Figure 11:
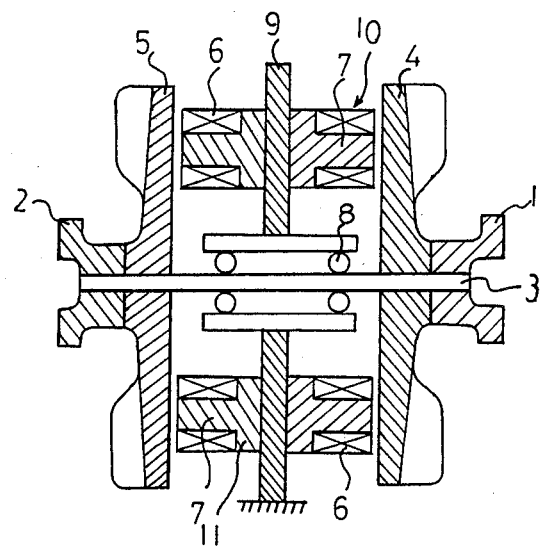
FIG. 11 is a sectional view of a conventional disc type eddy-current brake.
Figure 7:
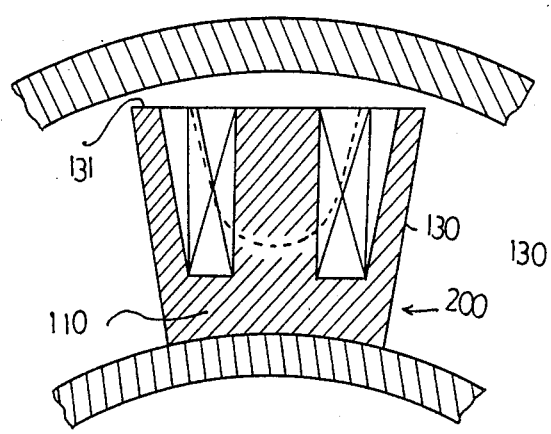
FIG. 7 is a sectional view illustrating an example of practical adaptation thereof.
Figure 5:
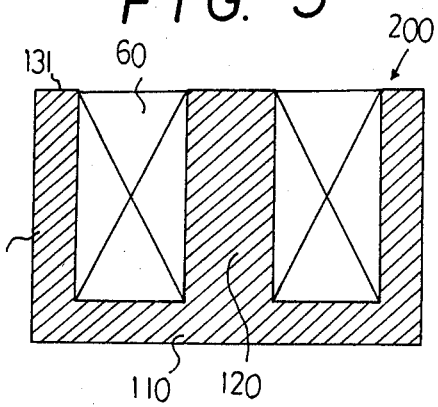
FIG. 5 is a sectional view of electromagnet.
Figure 8:
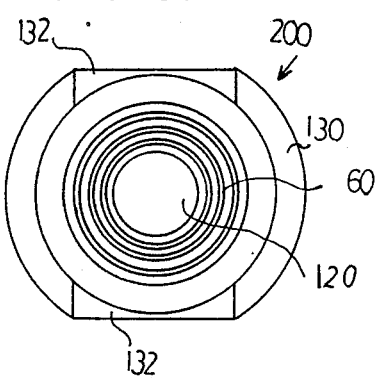
FIG. 8 is a plane view thereof.
Figure 6:
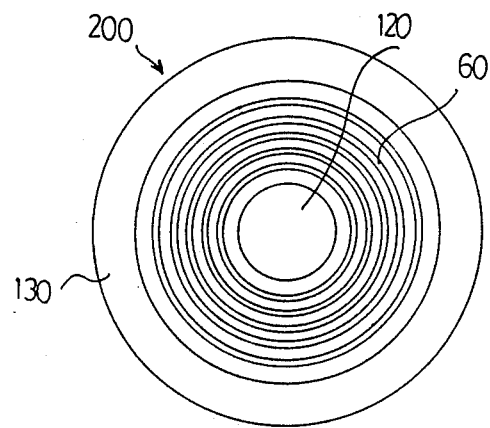
FIG. 6 is a plane view thereof.

Marked differences between the eddy-current brake according to this invention shown in FIG. 1 and the conventional eddy-current brake shown in FIG. 11 lie in the characteristic design of electromagnets 200 in this invention as compared with the electromagnets 10 in the conventional brake and in the provision of metallic layer 300 in this invention, which is not provided in the conventional brake. Flange couplings 1A, 2A, main shaft 30 joined thereto, discs 40, 50, ball bearings 80 and fixing plate 90 are identical with those in the conventional brake. Electromagnets 200, as illustrated in FIGS. 5 and 6, are basically composed of a circular flat bottom plate 110 made of a ferromagnetic material, a cylindrical magnetic pole case 130 formed integral with said bottom plate 110 so that said case erects parallel to the axis of the electromagnet from the outer edge of said bottom plate 110, and a columnar magnetic pole 120 also formed integral with said bottom plate 110 so that said magnetic pole projects vertically outwards from the center of said bottom plate 110. A coil 60 of copper wire is provided around said magnetic pole 120. Said magnetic pole case 130 is so designed that the area of its open end 131 parallel to the said bottom plate 110 will be equal to or greater than the cross-sectional area of the magnetic pole 120 which has the same sectional configuration as said case 130. A typical example of practical adaptation of said electromagnets 200 is shown in FIGS. 7 and 8. Magnetic pole case 130 is so formed that it is smallest in diameter at its edge conjugate to the bottom plate 110 and gradually enlarges in diameter toward its open end 131 so that said open end 131 can have a large area. Also, openings 132 are formed by cutting out the opposing portions of peripheral wall parallel to each other. These openings 132 are intended to facilitate ventilation so as to prevent rise of temperature of electromagnets 200. Discs 40, 50 are provided with a metallic layer 300 at their faces opposing the electromagnets 200, along a stretch equal to or greater than the maximum diameter of the open end 131 of said magnetic pole case 130. Said metallic layer 300 is composed of a non-magnetic material, such as copper, having a greater electroconductivity than said discs 40, 50. Such metallic layer 300 is formed as a thin ring-shaped flat plate and disposed in opposition to and slightly spaced-apart from electromagnets 200.

Figure 3:
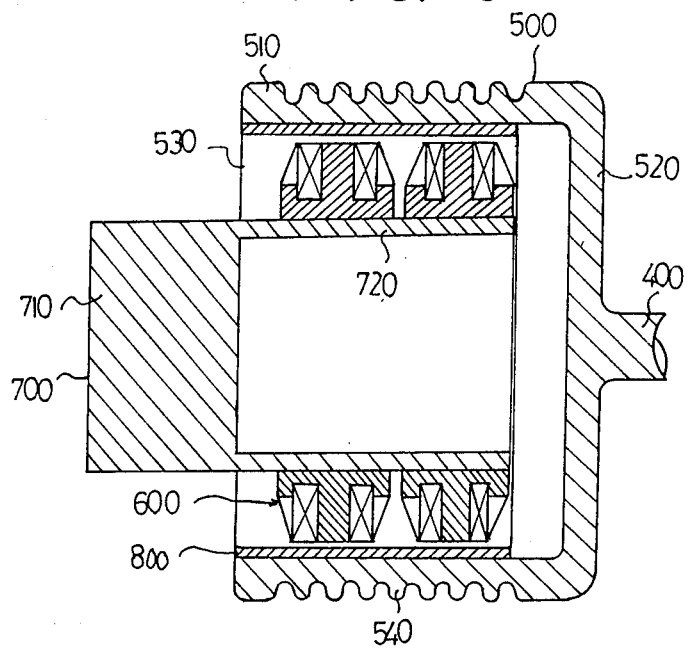
FIG. 3 is a sectional view of a drum type eddy-current brake in accordance with this invention.
Figure 4:
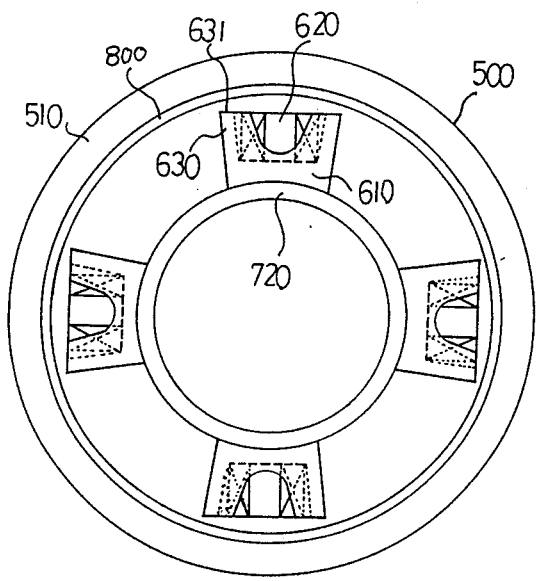
FIG. 4 is a schematic layout of electromagnets in the brake of FIG. 3.
Figure 10:
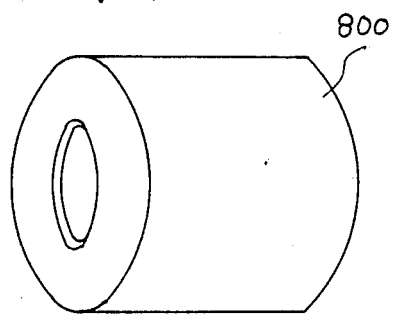
FIG. 10 is a perspective view of the metallic layer provided in the drum type eddy-current brake.
Figure 9:
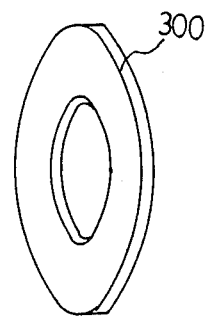
FIG. 9 is a perspective view of the metallic layer provided in the disc type eddy-current brake.

FIGS. 3 and 4 illustrate another embodiment of this invention as it was embodied as a drum type eddy-current brake. This drum type eddy-current brake features the enlarged sectional area of the magnetic circuit in comparison with the disc type eddy-current brake to increase the braking torque developed. In this drum type brake, the single rotor is formed as a drum 500 consisting of a peripheral wall portion 510 parallel to main shaft 400, a bottom wall portion 520 formed integral with and crossing main shaft 400 at right angles and an open portion 530 opening at the end opposite from said bottom wall portion 520. A metallic layer 800 is formed on the inner surface of said peripheral wall portion 530 of the drum 500. As shown in FIG. 10, said metallic layer 800 is formed as a thin-walled cylinder on the entirety of the inner surface of said peripheral wall portion 510. This layer is composed of a non-magnetic material, such as copper, having a greater electroconductivity than the peripheral wall portion 510 of the drum 500. Also, thin ring-shaped fins 540 are provided at a substantially same pitch around the outer surface of said peripheral wall portion 510. It is desirable that such fins 540 be also provided on the outer surface of the bottom wall portion 520. These fins 540 are formed integral with the drum 500 and serve for preventing the rise of temperature of the drum 500. Electromagnets 600 are the same as the ones shown in FIGS. 7 and 8.

The fixing plate 9 used in the conventional brake shown in FIG. 11 is replaced by a fixing plate 700 having a cylindrical portion 720 and a bottom portion 710 at an end of said cylindrical portion 720, said bottom portion 710 being secured to a brake block. Said fixing plate 700 itself is fixed so that it won't rotate with other elements and also won't move easily. Said fixing plate 700 has its cylindrical portion 720 placed concentrically inside the drum 500 so that the open end thereof will oppose the inner face of the bottom wall portion 520 of said drum 500 with a slight spacing therebetween. The outer diameter of said cylindrical portion 720 is made smaller than the inner diameter of the peripheral wall portion 510 of said drum 500, and electromagnets 600 are disposed radially between said cylindrical portion 720 and the peripheral wall portion 510 of said drum 500. The bottom plates 610 of said electromagnets 600 are detachably secured to the outer peripheral surface of said cylindrical portion 720 so that the magnetic pole 620 and the open end 631 of the magnetic pole case 630 will face the metallic layer 800 on the inner surface of said peripheral wall portion 510 with a slight spacing therebetween.

INDUSTRIAL APPLICABILITY

The eddy-current brake of this invention is suited for use as an auxiliary brake for the main brake system in a vehicle.

What we claim is:

1. In an eddy-current brake which includes a pair of rotors made of a ferromagnetic material and includes a plurality of electromagnets provided at angularly spaced locations, in which said rotors are so disposed that they cross the magnetic flux and a braking torque is produced by the eddy-current generated in said rotors, the improvement comprising wherein a metallic layer formed from a non-magnetic material having a greater electroconductivity than said rotors is provided on a side of each said rotors which faces the magnetic poles of said electromagnets, and wherein the coil of each said electromagnet is annular, extends around the magnet pole thereof, and is enclosed by an annular magnetic pole case formed from a ferromagnetic material so that the sectional area of said case where the magnetic line of force passes is equal to or greater than the cross-sectional area of the magnetic pole.

2. An eddy-current brake according to claim 1, wherein each said electromagnet inclues a ferromagnetic casing member having as portions thereof the pole and the case of such electromagnet, the casing member including a circular plate-like bottom portion, the pole projecting outwardly from a center portion of said bottom portion on one side thereof and said case being cylindrical and projecting outwardly on said one side of said bottom portion from a peripheral edge of said bottom portion.

3. An eddy-current brake according to claim 2, wherein said electromagnets are substantially uniformly angularly spaced with respect to an axis of rotation of said rotors.

4. In an eddy-current brake which includes a pair of rotors made of a ferromagnetic material and electromagnets, in which said rotors are so disposed that they cross the magnetic flux and a braking torque is produced by the eddy-current generated in said rotors, the improvement comprising wherein a metallic layer formed from a non-magnetic material having a greater electroconductivity than said rotors is provided on a side of each said rotor which faces the magnetic poles of said electromagnets; wherein the coil of each said electromagnet is enclosed by a magnetic pole case formed from a ferromagnetic material so that the sectional area of said case where the magnetic line of force passes is equal to or greater than the cross-sectional area of the magnetic pole; including a rotatably supported shaft; wherein said rotors are discs mounted on the shaft transversely thereto so as to be rotatable integrally with said shaft, each of said discs having said metallic layer provided on its inside flat surface as a thin ring-shaped metallic layer; and wherein the magnetic pole case disposed facing said metallic layer with a slight spacing therebetween includes a disc-shaped bottom plate and a frusto-conical cylindrical body extending spreadingly from the outer peripheral edge of said bottom plate so that it has its maximum diameter at its top open end.

5. An eddy-current brake comprising a rotor made of a ferromagnetic material and electromagnets, in which said rotor is so disposed that it crosses the magnetic flux and a braking torque is produced by the eddy current generated in said rotor, wherein a metallic layer formed from a non-magnetic material having a greater electroconductivity than said rotor is provided on a side of said rotor which faces the magnetic poles of said electromagnets, and wherein the coil of each said electromagnet is enclosed by a magnetic pole case formed from a ferromagnetic material so that the sectional area of said case where the magnetic line of force passes is equal to or greater than the cross-sectional area of the magnetic pole; including a rotatably supported shaft, wherein said rotor is a bottomed cylinder having a peripheral wall portion parallel to the shaft and a bottom wall portion formed integral with and transversely to the shaft so as to be rotatable integrally therewith, said peripheral wall portion having said metallic layer provided on its inner peripheral surface as a thin cylindrical metallic layer, and wherein the magnetic pole case includes a disc-shaped bottom plate and a frusto-conical cylindrical body extending spreadingly from the outer-peripheral edge of said bottom plate so that it has its maximum diameter at its top open end.

6. An eddy-current brake, comprising an electromagnet and a member which has thereon a surface and which is supported for movement relative to said electromagnet so that said surface moves past said electromagnet while remaining adjacent thereto; wherein said electromagnet includes a pole which is made of a magnetic material and which has an end surface facing and adjacent said surface on said member, a coil wound around said pole, and a case which is made of a magnetic material and extends around said coil and which has an end surface facing and adjacent said surface on said member, said end surface of said case having an area which is at least as large as the area of said end surface of said pole; wherein said case has a tubular frusto-conical shape which diverges in diameter in a direction toward said surface on said member.

7. An eddy-current brake according to claim 6, wherein said case has cutouts which extend thereinto from said end surface thereof and are on diametrically opposite sides thereof.

8. An eddy-current brake according to claim 7, including a bottom plate provided at an end of said pole remote from said surface on said member, said pole projecting from a center portion of said bottom plate toward said surface on said member, and said casing projecting from a peripheral edge of said bottom plate toward said surface on said member, said pole, said case and said bottom plate being integral portions of a single structural part which is made of a magnetic material.

9. An eddy-current brake, comprising an electromagnet and a member which has thereon a surface and which is supported for movement relative to said electromagnet so that said surface moves past said electromagnet while remaining adjacent thereto; wherein said electromagnet includes a pole which is made of a magnetic material and which has an end surface facing and adjacent said surface on said member, a coil wound around said pole, and a case which is made of a magnetic material and extends around said coil and which has an end surface facing and adjacent said surface on said member, said end surface of said case having an area which is at least as large as the area of said end surface of said pole.

10. An eddy-current brake according to claim 9, including on said surface of said member a metallic layer which is a non-magnetic material and which has a greater electroconductivity than said member.

11. An eddy-current brake according to claim 10, wherein said member is supported for rotation about an axis and said surface thereon is an annular surface concentric to said axis, and wherein said electromagnet is stationarily supported at a location spaced radially from said axis.

12. An eddy-current brake according to claim 11, wherein said surface extends approximately perpendicular to said axis, and wherein said pole of said electromagnet extends approximately parallel to said axis.

13. An eddy-current brake according to claim 11, wherein said surface on said member is a radially inwardly facing cylindrical surface, and wherein said pole of said electromagnet extends approximately radially of said axis.

14. An eddy-current brake according to claim 13, wherein said member includes a cylindrical portion which is concentric to said axis and which has thereon said annular surface, and wherein said cylindrical portion of said member has on a radially outer side thereof a plurality of axially spaced, radially outwardly projecting, circumferentially extending ribs.

15. An eddy-current brake according to claim 9, wherein said coil is circular and concentrically encircles said pole, and wherein said case is cylindrical and concentrically encircles said coil and said pole.

16. An eddy-current brake according to claim 15, including a bottom plate provided at an end of said pole remote from said surface on said member, said pole projecting from a center portion of said bottom plate toward said surface on said member, and said case projecting from a peripheral edge of said bottom plate toward said surface on said member, said pole, said case and said bottom plate being integral portions of a single structural part which is made of a magnetic material.

17. An eddy-current brake according to claim 16, wherein said movement of said electromagnet relative to said surface is relative rotational movement about an axis, and including a plurality of said electromagnets provided at substantially uniformly spaced angular intervals around said axis.

* * * * *